(12) United States Patent
Seth et al.

(10) Patent No.: US 8,909,629 B2
(45) Date of Patent: Dec. 9, 2014

(54) PERSONALIZED LOCATION TAGS

(75) Inventors: Rohan Seth, San Francisco, CA (US); Chris Lambert, San Francisco, CA (US); Jean Zheng, San Francisco, CA (US); Michael Chu, Los Altos, CA (US)

(73) Assignee: Google Inc., Mountain View, CA (US)

( * ) Notice: Subject to any disclaimer, the term of this patent is extended or adjusted under 35 U.S.C. 154(b) by 508 days.

(21) Appl. No.: 12/728,523

(22) Filed: Mar. 22, 2010

(65) Prior Publication Data

US 2011/0227699 A1 Sep. 22, 2011

(51) Int. Cl.
*G06F 17/30* (2006.01)
*G06Q 30/02* (2012.01)
*G08B 21/02* (2006.01)

(52) U.S. Cl.
CPC ............ *G08B 21/0269* (2013.01); *G06Q 30/02* (2013.01)
USPC ........................................................ 707/724

(58) Field of Classification Search
None
See application file for complete search history.

(56) References Cited

U.S. PATENT DOCUMENTS

| | | | |
|---|---|---|---|
| 5,848,373 A | 12/1998 | DeLorme et al. | |
| 8,407,213 B2* | 3/2013 | Singh et al. | 707/724 |
| 8,437,776 B2* | 5/2013 | Busch | 455/456.1 |
| 2008/0132251 A1* | 6/2008 | Altman et al. | 455/457 |
| 2008/0282177 A1* | 11/2008 | Brown et al. | 715/763 |
| 2009/0005987 A1* | 1/2009 | Vengroff et al. | 701/300 |
| 2009/0215469 A1* | 8/2009 | Fisher et al. | 455/456.3 |
| 2009/0274145 A1* | 11/2009 | Laliberte | 370/352 |
| 2010/0004857 A1* | 1/2010 | Pereira et al. | 701/209 |
| 2011/0022312 A1* | 1/2011 | McDonough et al. | 701/209 |
| 2011/0231493 A1* | 9/2011 | Dyor | 709/206 |

OTHER PUBLICATIONS

Gruteser et al. Anonymous Usage of Location-Based Services Through Spatial and Temporal Cloaking, 2003 ACM.*
Richard L. et. al., "Geographical information systems and location science" Computers & Operations Research, vol. 29, Issue 6, May 2002, pp. 541-562.
International Search Report Application No. PCT/US2011/029185, dated Nov. 1, 2011.
Nan Liu et. al., Optimal Siting of Fire Stations Using GIS and ANT Algorithm, Journal of Computing in Civil Engineering, © ASCE, Sep./Oct. 2006, pp. 361-369.
Ligmann-Zielinska et. al., Sustainable Urban Land Use Allocation with Spatial Optimization, Proceeding, the $8^{th}$ Int'l Conf. on Geocomputation, 2005, 18 pgs.
http://brightkite.com/learn_more, retrieved from the Internet on Mar. 22, 2010, 3 pages.
http://blog.brightkite.com/2009/08/19/iphone-update-inbox-components-mentions/, retrieved from the Internet on Mar. 22, 2010, 12 pages.

* cited by examiner

*Primary Examiner* — Kevin L Young
(74) *Attorney, Agent, or Firm* — McDermott Will & Emery LLP (57) ABSTRACT

Systems and methods are provided for creating and using personalized location information tags (geotags). Personalized geotags take the place of generic location information such as latitude/longitude coordinates or granular city/state information. Such geotags may be published to present to selected people, e.g., family and friends, a user's current location. Thus, the user's location may be shown as "Home" or "Gym," providing user-specific information without having to list a street address or latitude/longitude coordinates. Personalized geotags may be inferred based upon historical location information of the user. Geotags may also be inferred based upon geotag selections from other users in a network. A matching engine may select an appropriate geotag given the current location of a user device or based upon historical location information associated with the user.

17 Claims, 8 Drawing Sheets

Inbox – JSmith@mail.com

---

- John Smith
  - Home
- Arun Sharmin
- Chris Lake
- Bob Richter
  - 37° 37' N    122° 23' W
- Jonas Mylie
  - Gym
- Mike Jordan
  - Mountain View, CA
- Billy Stevens
- Jean Lee
  - Office
- Lisa Lind Options ▼      Add Contact

PERSONALIZED LOCATION TAGS

BACKGROUND OF THE INVENTION

1. Field of the Invention

The invention relates generally to location enabled services and applications. More particularly, aspects are directed to personalized user location tags.

2. Description of Related Art

Location-based services and applications are becoming more and more popular as the number and types of portable electronic devices increases. Devices such as mobile telephones, PDAs and laptop/palmtop computers may be used indoors and outdoors in one location or while on the go.

User may let their friends and families know what they are doing and where they are at with any number of applications, such as with texting or via Google's Latitude service. The user's location can be "published" in different ways. For instance, the user's location may be identified as a set of latitude/longitude coordinates, as a place mark on a map, or given as a street address.

The location of the user's device may be found with a number of different technologies. One such technology is satellite-based location using the Global Positioning System ("GPS"). Another location technology employs triangulation among multiple cell towers or WiFi access points to estimate the device's position. A further location technology is IP geocoding. In this technique, a device's IP address may be mapped to a physical location.

Depending on the level of granularity, the published location may be a specific point such as a street address, a town, a state, etc. If the granularity is coarse, multiple users may be represented by the same location. For instance, if there are several users in San Francisco, then a status showing "San Francisco" for each of them doesn't convey much meaningful information. In another situation, the published location may be too invasive. For example, the user may not want to publish his or her actual location (e.g., street address or even city).

SUMMARY OF THE INVENTION

According to an aspect of the invention, systems and methods provide personalized and/or contextual location tags that can be used with a wide variety of applications.

In one embodiment, a method for personalizing user location information is provided. The method comprises analyzing at least one computer database containing information about a selected user to determine whether the at least one computer database includes geographical location information associated with the selected user; selecting a result set from the at least one computer database if it includes the geographical location information, the result set including at least one physical location; configuring personalized geotags for each physical location in the result set; storing the personalized geotags in a memory; and setting mapping information for a map, the mapping information including at least a selected one of the personalized geotags.

In one example, the selected geotag includes a location, a radius around the location, and a name that corresponds to the location and the selected user. In another example, the result set is inferred by a matching engine based upon past activity by the selected user.

In an alternative, the method further comprises publishing the mapping information, including the selected personalized geotag, on an electronic map. In another alternative, the method further comprises enabling and disabling access to the mapping information based upon a selection by the selected user.

In a further example, the at least one computer database is stored on a portable client device, and the selecting and configuring functions are performed by a matching engine of the portable client device. Alternatively, at least one of the personalized geotags configured for a given physical location in the result set is inferred based upon historical location information. In yet another alternative, at least one of the personalized geotags configured for a given physical location in the result set is chosen due to a likelihood that the selected user will be at the given physical location again based on past behavior.

According to another embodiment, a processing system for processing personalized user location information is provided. The processing system comprises at least one processor, a matching engine associated with the at least one processor, and memory for storing data. The memory is coupled to the at least one processor. The matching engine is configured to analyze at least one computer database stored in the memory. The at least one computer database contains information about a selected user to determine whether the at least one computer database includes geographical location information associated with the selected user. The matching engine is also configured to select a result set from the at least one computer database if it includes the geographical location information, to configure personalized geotags for each physical location in the result set, and to set mapping information for a map. The result set includes at least one physical location. And the mapping information includes at least a selected one of the personalized geotags.

In one example, the matching engine is configured to infer the result set based upon past activity by the selected user. In another example, the processing system is configured to transmit the mapping information, including the selected personalized geotag, to a remote server for publication on an electronic map. In a further example, the processing system comprises a portable client device and the at least one computer database is stored in the memory of portable client device.

In one alternative, the processor is configured to receive requests from another user about a location of the selected user, to validate whether that other user has authorization to access the location, and to transmit the mapping information including the selected personalized geotag identifying the location to the other user upon validation. Here, the processor desirably validates the authorization if the other user is a member of a social network of the selected user. And if the selected user is traveling between two physical locations in the result set, the processor may be configured to transmit updated mapping information including an indicator showing the selected user is traveling.

In accordance with another embodiment of the invention, a method of managing personalizing user location information is provided. The method comprises identifying, by a matching engine, one or more personalized geotags, each personalized geotag identifying a specific user and a location of the specific user; determining, by the matching engine, whether there is an overlap between a given one of the personalized geotags and any other geotags; and selecting the geotag with that most closely correlates to a given location of the specific user.

According to one alternative, the method further comprises determining, by the matching engine, whether the given personalized geotag and the overlapping geotags are ranked, where the rankings are determined according to a preference of the specific user. In another alternative, the method further comprises determining, by the matching engine, whether the given personalized geotag and the overlapping geotags are ranked, where the rankings are determined according to historical location information of the specific user.

In one example, each personalized geotag includes a location radius, and the overlap is caused by overlapping radii of the geotags. And in another example, each personalized geotag has a confidence level for the location, and the overlap is caused by varying confidence levels between different locations.

DETAILED DESCRIPTION

Aspects, features and advantages of the invention will be appreciated when considered with reference to the following description of exemplary embodiments and accompanying figures. The same reference numbers in different drawings may identify the same or similar elements. Furthermore, the following description is not limiting; the scope of the invention is defined by the appended claims and equivalents.

In accordance with aspects of the invention, personalized and contextual location tags are employed to provide meaningful location information about a user. Such tags can be shared with other people using different applications, services and devices. They provide sufficient information without being overly invasive.

Figure 1A:
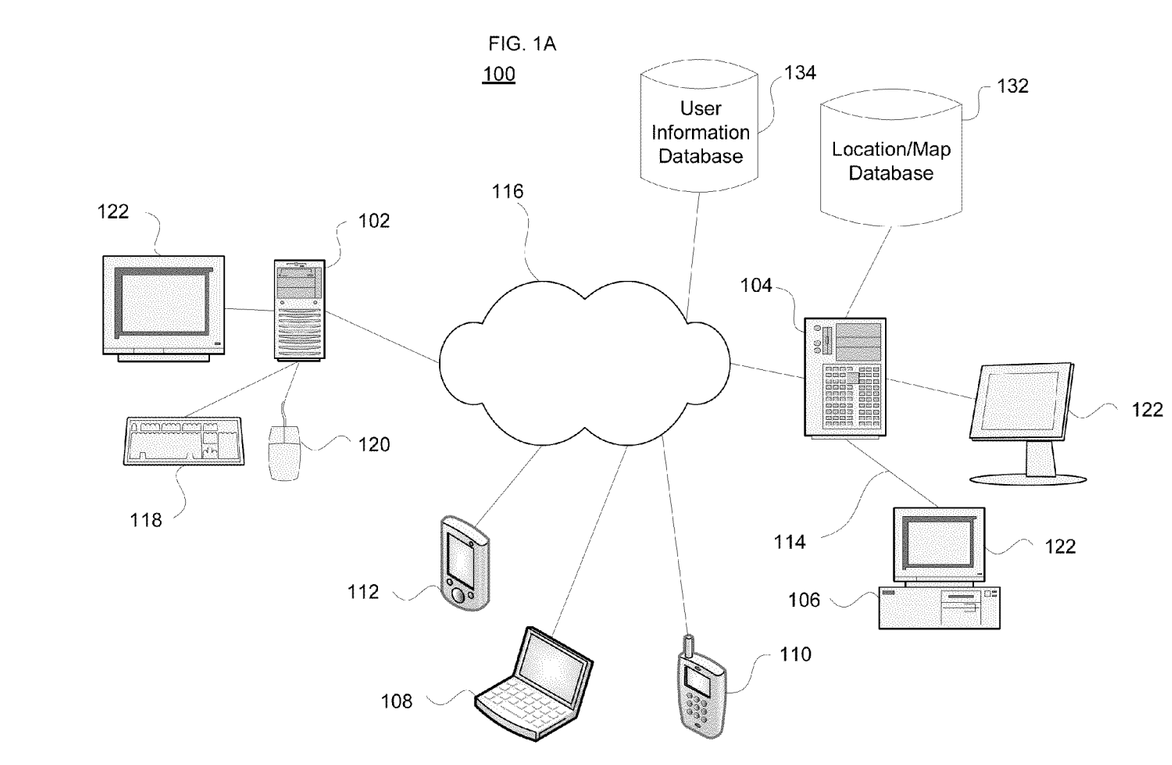
FIGS. 1A-B illustrate a computer system for use in accordance with aspects of the invention.

Turning to FIG. 1A, this illustration presents a schematic diagram of a computer system depicting various computing devices that can be used alone or in a networked configuration in accordance with aspects of the invention. For example, this figure illustrates a computer network 100 having a plurality of computers 102, 104, 106 and 108 as well as other types of user devices such as mobile phone 110 and a PDA 112. Various elements in the computer network 100 may be interconnected via a local or direct connection 114 and/or may be coupled via a communications network 116 such as a local area network ("LAN") such as a WiFi network, a wide area network ("WAN"), the Internet, etc. and which may be wired or wireless. The communications network 116 may include a plurality of nodes having routers, servers, etc.

Figure 1B:
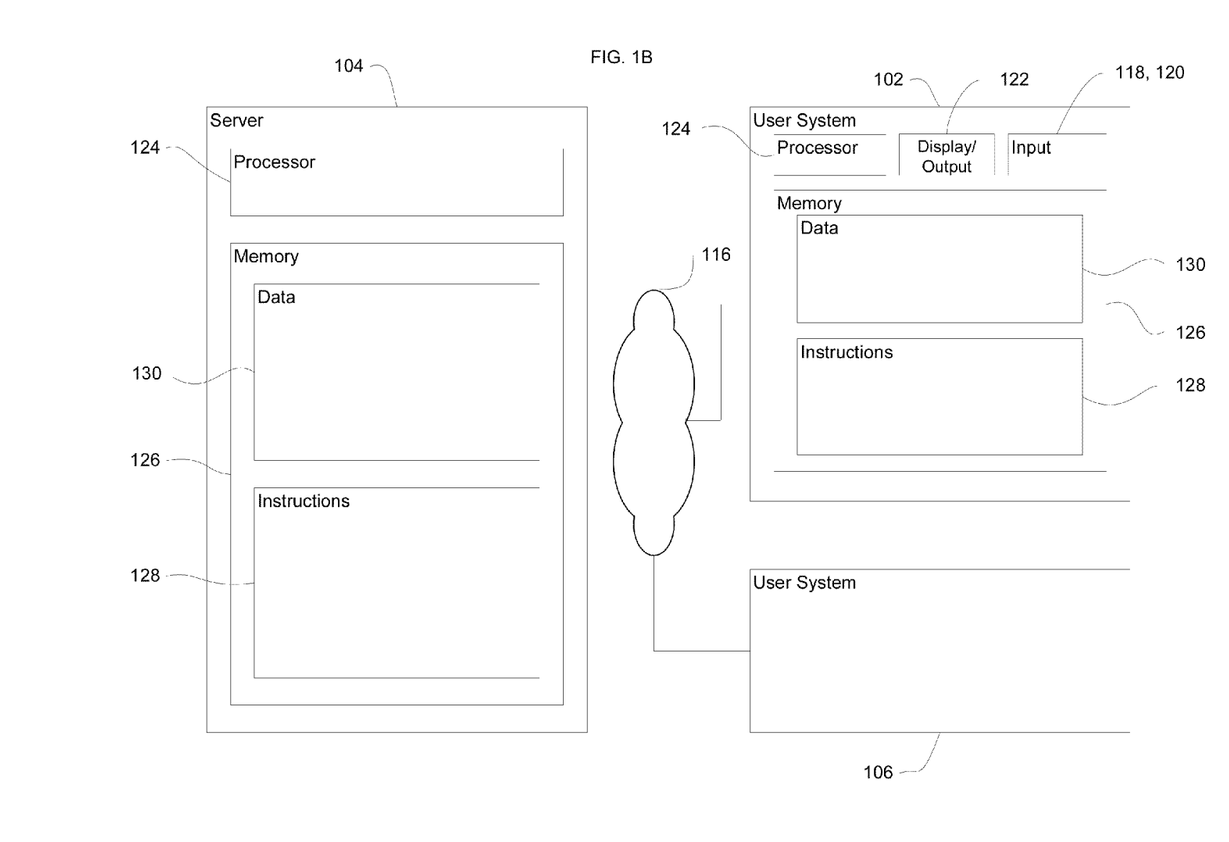

Each computer can include, for example, one or more computing devices having user inputs such as a keyboard 118 and mouse 120 and/or various other types of input devices such as pen-inputs, joysticks, buttons, touch screens, etc., as well as a display 122, which could include, for instance, a CRT, LCD, plasma screen monitor, TV, projector, etc. Each computer 102, 104, 106 and 108 may be a personal computer, server, etc. By way of example only, computers 102 and 106 may be personal computers while computer 104 may be a server and computer 108 may be a laptop/palmtop. As shown in FIG. 1B each computer, such as computers 102 and 104, contains a processor 124, memory 126 and other components typically present in a computer.

Memory 126 stores information accessible by processor 124, including instructions 128 that may be executed by the processor 124 and data 130 that may be retrieved, manipulated or stored by the processor. The memory may be of any type capable of storing information accessible by the processor, such as a hard-drive, ROM, RAM, CD-ROM, DVD, Blu-Ray disk, flash memories, write-capable or read-only memories. The processor 124 may comprise any number of well known processors, such as processors from Intel Corporation. Alternatively, the processor may be a dedicated controller for executing operations, such as an ASIC.

The instructions 128 may comprise any set of instructions to be executed directly (such as machine code) or indirectly (such as scripts) by the processor. In that regard, the terms "instructions," "steps" and "programs" may be used interchangeably herein. The instructions may be stored in any computer language or format, such as in object code or modules of source code. The functions, methods and routines of instructions in accordance with the present invention are explained in more detail below.

Data 130 may be retrieved, stored or modified by processor 124 in accordance with the instructions 128. The data may be stored as a collection of data. For instance, although the invention is not limited by any particular data structure, the data may be stored in computer registers, in a relational database as a table having a plurality of different fields and records, XML documents, or flat files. Map-type image data may be stored in flat files such as keyhole flat files ("KFF").

The data may also be formatted in any computer readable format such as, but not limited to, binary values, ASCII etc. Similarly, the data may include images stored in a variety of formats such as vector-based images or bitmap images using lossless (e.g., BMP) or lossy (e.g., JPEG) encoding. Moreover, the data may include any information sufficient to identify the relevant information, such as descriptive text, proprietary codes, pointers, references to data stored in other memories (including other network locations) or information which is used by a function to calculate the relevant data.

Although the processor 124 and memory 126 are functionally illustrated in FIG. 1B as being within the same block, it will be understood that the processor and memory may actually comprise multiple processors and memories that may or may not be stored within the same physical housing or location. For example, some or all of the instructions and data may be stored on a removable recording medium such as a CD-ROM, DVD or Blu-Ray disk. Alternatively, such information may be stored within a read-only computer chip. Some or all of the instructions and data may be stored in a location physically remote from, yet still accessible by, the processor. Similarly, the processor may actually comprise a collection of processors which may or may not operate in parallel. Data may be distributed and stored across multiple memories 126 such as hard drives, data centers, server farms or the like.

In one aspect, server 104 communicates with one or more client computers 102, 106 and/or 108, as well as devices such as mobile phone 110 and PDA 112. Each client computer or other client device may be configured similarly to the server 104, with a processor, memory and instructions, as well as one or more user input devices 118, 120 and a user output device, such as display 122. Each client computer may be a general purpose computer, intended for use by a person, having all the components normally found in a personal computer such as a central processing unit ("CPU"), display, CD-ROM, DVD or Blu-Ray drive, hard-drive, mouse, keyboard, touch-sensitive screen, speakers, microphone, modem and/or router (telephone, cable or otherwise) and all of the components used for connecting these elements to one another.

The server 104, client computers and other user devices are capable of direct and indirect communication with other computers, such as over network 116. Although only a few computing devices are depicted in FIGS. 1A and 1B, it should be appreciated that a typical system can include a large number of connected servers and clients, with different devices being at different nodes of the network. The network 116, including any intervening nodes, may comprise various configurations and protocols including the Internet, intranets, virtual private networks, wide area networks, local networks, private networks using communication protocols proprietary to one or more companies, Ethernet, WiFi, Bluetooth and HTTP.

Communication across the network, including any intervening nodes, may be facilitated by any device capable of transmitting data to and from other computers, such as modems (e.g., dial-up or cable), network interfaces and wireless interfaces. Server 104 may be a web server. Although certain advantages are obtained when information is transmitted or received as noted above, other aspects of the invention are not limited to any particular manner of transmission of information. For example, in some aspects, the information may be sent via a medium such as a disk, tape, CD-ROM, DVD, Blu-Ray disk or directly between two computer systems via a dial-up modem. In other aspects, the information may be transmitted in a non-electronic format and manually entered into the system.

Returning to FIG. 1A, the network 100 may also include one or more databases. For instance, it may include a location database 132. The location database 132 may be directly or indirectly coupled to server 104. In an alternative, the location database 132 may be part of or otherwise logically associated with the server 104. The location database 132 may include different sets or types of data. By way of example only, the database 132 may maintain location and/or map-related data, which may be stored in one or more KFFs. The database 132 may also store the data 130 in one or more KFFs.

User devices such as laptop/palmtop 108, PDA 112 and mobile phone 110 may also include or store user-related information in a database 134. Such information may include, for instance, a web browsing history, a website searching history, map data, the user's address book, e-mail archives and/or calendar entries. Given the sensitive nature of this information, the database 134 should securely store the data to prevent unauthorized access. Thus, the data may be encrypted for storage. In one example, the database 134 is maintained on network 100 separate from the user devices. In another example, the database 134 may be locally stored on one or more of the user devices, for example in memory 126 thereof. In a further example, the database 134 comprises multiple databases or is part of the database 132.

In one aspect of the invention, a user may define personalized geotags. For instance, a geotag may comprise a location object that includes latitude, longitude, radius, and name information. The name desirably corresponds to the description of a location at or near the latitude and longitude and within the radius.

Figure 2:
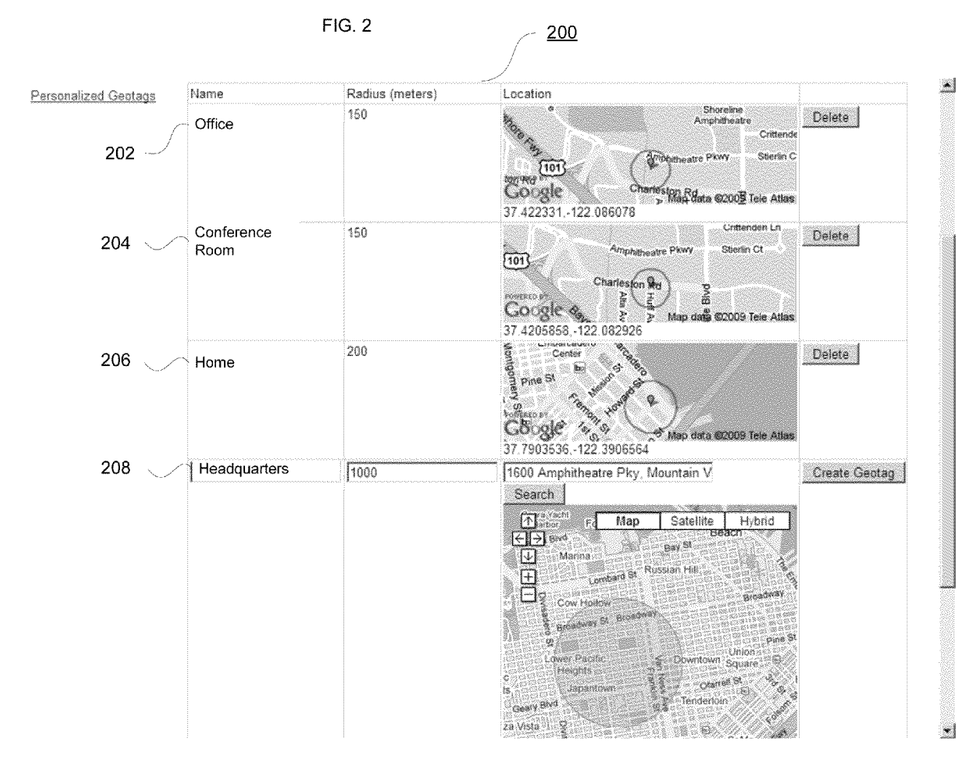
FIG. 2 illustrates a geotag interface in accordance with aspects of the invention.

FIG. 2 illustrates an exemplary user interface 200 displaying personalized geotags in a browser-type application. The interface may be implemented as a web page or applet accessible to various user devices such as laptop 108, phone 110 and PDA 112 of FIG. 1A. FIG. 2 illustrates different geotags 202, 204, 206 and 208 representing different locations for a given user. In particular, geotag 202 identifies the location of the user's office. Geotag 204 identifies the location of a conference room. Geotag 206 identifies the user's home. And geotag 208 identifies the headquarters of the user's business. As the geotag information is associated with a particular user, it provides more context and makes the identified location much more relevant than a conventional geographical coordinate. In addition, it also masks the user's specific location (e.g., latitude/longitude or street address) that the user may be unwilling to have published.

The interface 200 may permit a user to add, delete and edit geotags. As shown, each personalized geotag is associated with a radius. Each personalized geotag is also associated with a specific location, which may represent a pair of latitude and longitude coordinates. Thus, as shown in the "Location" section, each personalized geotag covers a selected area based upon the lat/long coordinates and radius. As the user's device physically moves into the predefined area, or is determined to be within that area, the user's location may be published to reflect this fact.

In one example, the user may initially be at his/her office and the published location will show "Office" instead of a set of coordinates. When the user goes to a meeting in another location, the published location may show "Conference Room" when the user's device enters the radius of geotag 204. Each name for a personalized geotag has specific meaning for the user. Thus, if a personalized geotag is published and is seen by friends or family, they will know location is meant by Home without needing to see the street address.

The system may infer that a user is traveling between two locations, especially if the trip encompasses a frequent route based on the user's location history. In this case, the system may show a "travelling" or "on the road" indicator for a given time period based on the history information.

Figure 3:
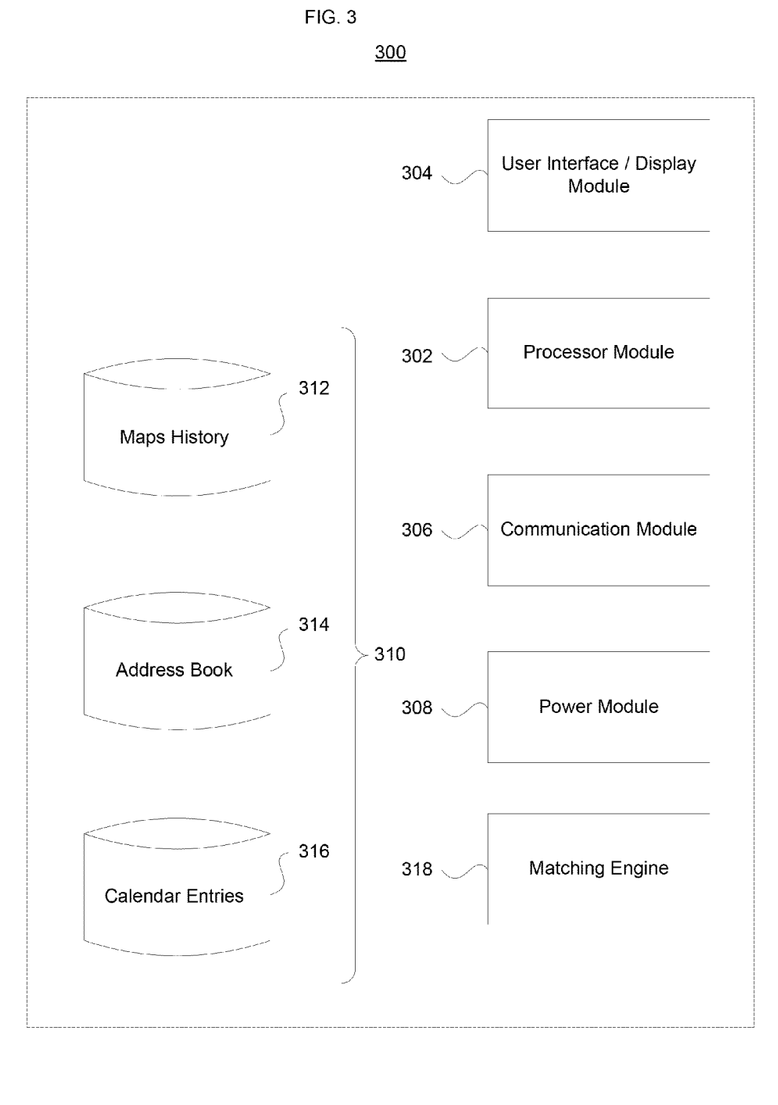
FIG. 3 illustrates a device architecture in accordance with aspects of the invention.

FIG. 3 illustrates a device architecture 300 for managing personalized geotag information. The architecture 300 includes a processor module 302, a user interface/display module 304, a communication module 306, a power module 308 and a memory module 310. The processor module 302 may include a processor such as processor 124 or a controller and its attendant circuitry (e.g., local memory, floating point and/or integer processing elements, DMA unit). The user interface/display module 304 includes user inputs and outputs such as inputs 118 and 120 and display 122 of FIGS. 1A and 1B. The communication module 306 contains a protocol stack and attendant circuitry for communicating across a network such as network 116 or for direct device to device communication. The power module 308 provides power to the various modules of the architecture 300, and may include a rechargeable battery and/or power cable.

The memory module 310 may contain database 134. In one example, the memory module 310 comprises a plurality of sub-databases focusing on different applications and/or user attributes. For instance, as shown in FIG. 3, the memory module 310 may include a maps history database 312, an address book database 314 and a calendar entries database 316. Other information, such as real time flight status information, may be stored in other sub-databases.

The information stored in each of these sub-databases may be associated with specific programs or types of applications, or with the user's overall operation of the device. For instance, the maps history database 312 may be associated with one or more web browsers or other applications such as Google Earth. The address book database 314 may be linked to the user's messaging application, such as Google's Gmail or Microsoft Outlook. And the calendar entries database 316 may similarly be linked to the messaging application or other application such as Google Calendar. Thus, in the real time flight status case case, flight information shown in a calendar may be coupled with real time flight status information from airline and/or airport databases. This allows the system to infer how long the user may be at a connecting airport if a connection is delayed. While a number of different sub-databases have been identified above, other sub-databases which may contain location-related information may also be employed, such as the database associated with Google Latitude, a tool which lets users share their current location with friends.

The architecture 300 may also include a matching engine 318. In one function, the matching engine 318 extracts location-related information from the sub-databases 312-316. For instance, it may search map histories and the address book for geographical data. This information may be correlated by the matching engine 318 with various locations associated with the user, and the matching engine 318 may create or modify personalized geotags via interface 200 accordingly.

In one example, the communication module 306 may include a GPS receiver or other location-enabling technology. As the location of the user's device changes, location information may be passed to the matching engine 318. The matching engine 318 compares the current location with geographical data obtained from the sub-databases. Based upon this comparison, the matching engine 318 may select a personalized geotag. This personalized geotag may be published, for instance by transmitting the information to a web-based application. Thus, when the user's contacts access the application, the user's personalized geotag is presented.

In another example, if the user has personalized geotags available, the matching engine 318 performs a spatial lookup to find the closest geotag where the user's current location overlaps or is completely contained in the latitude, longitude and radius of the geotag. If multiple geotags are available, the matching engine 318 desirably picks the one with the highest overlap. Alternatively, in this case the matching engine 318 may select one the user's own ranked preferences, if rankings of such geotags has been enabled.

A confidence level may be associated with the user's current location. This confidence level may depend on the quality and source of the location information. Thus, if the user's device is GPS enabled, the confidence level may be high due to the generally high accuracy of GPS signal. If the user's device has been located using triangulation or reverse IP geocoding, then the confidence level may be correspondingly lower given the inherent uncertainties of such location estimates.

The matching engine 318 may also keep track of how or when a user's device "hits" a geotag, and select a given one based on past probability. For example, if the user's home and work locations are close by, based on historical data, the matching engine 318 may infer that during working hours on weekdays the user is at Work instead of at Home.

In a further example, if no strong personalized geotag match is available, the matching engine 318 may employ reverse geocoding to select an appropriate generic geotag. Alternatively in this case, the actual location (e.g., latitude and longitude or city name) may be used instead of a geotag.

While the databases 312-316 and the matching engine 318 are shows in FIG. 3 as being part of a user device architecture, they may be maintained in one or more nodes in network 116 of FIG. 1A. Thus, in one example, the databases 312-316 may be part of a database 134 maintained by one or more datacenters. And the matching engine 318 may be part of server 104 or another computer in the network.

Figure 4:
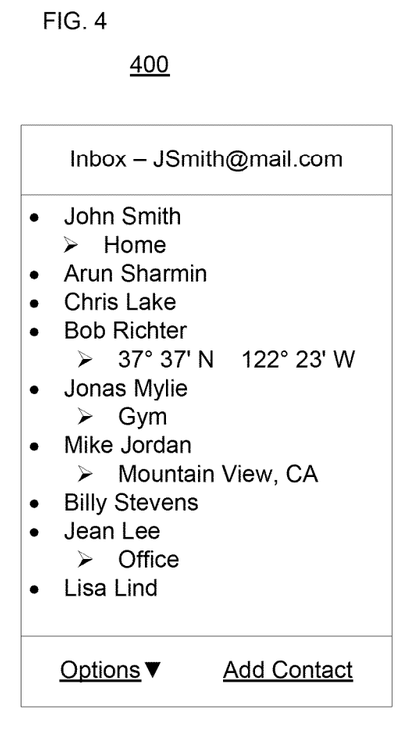
FIG. 4 illustrates a geotag-enabled application in accordance with aspects of the invention.

FIG. 4 illustrates an exemplary application 400 that incorporates personalized geotags into a user interface. As shown, the application may be an email-type application. Contacts in the user's network or circle of friends are shown. Certain contact, including the user himself/herself, may have personalized geotags associated with their locations. In this case, the user's location is shown as Home, while that of Jean Lee is shown as Office and that of Jonas Mylie is shown as Gym. Generic geotags may also be published. Thus, Mike Jordan's location is shown as Mountain View, Calif. And if a user does not have any geotags but the user device's location can be IP geocoded, then a latitude/longitude location may be shown, such as with the location for Bob Richter.

As indicated above, personalized geotags may be inferred based on historical location information. This location information may be stored in database 132 and/or database 134. For example, the system may have statistically reliable information that the user's device is located at a certain place from 10 pm to 8 am each weekday. Similarly, such information may also indicate that the user's device is at another place from 9 am to 6 pm each weekday. Given such information, the first location may be inferred to be "Home" and the second location may be inferred to be the user's "Office." If such inferences are incorrect, the user may modify or delete them, for instance using the interface 200 of FIG. 2.

Alternatively, the matching engine 318 may evaluate location information from the databases 312-316 and other sources to identify possibilities for other personalized geotags. By way of example, the last X places visited by the user (e.g., restaurants, shops, schools, parks) may be flagged for potential personalized geotags. The user may use the interface 200 to modify, add or delete such geotags.

Additionally, other geotags may be places that the user has "snapped to" in the past. This may include a probability of how likely the user is to be at that place again based on past behavior. Thus, if the user eats at a given restaurant most Thursday evenings, if the current location of the user's device is not known, the system may infer that the user is likely to be at that restaurant on Thursdays and publish the information accordingly. In another example, even if the user's device is not powered on or is not receiving a signal, the system may publish the user's expected location depending on the time of day and/or day of week using the information stored in the databases 132 and 134.

In a further scenario, geotags may be inferred using "wisdom of the crowds." For example, if many users defined a geotag around a park which is not in a given reverse geocode index stored in database 132, the park's geotag set by various users may automatically be used for people in or near the park. Privacy concerns may be mitigated by focusing on only using geotags from a user's own or nearby social network.

In a further scenario, not all geotags may be made available to a matching engine immediately. For instance, a user may be given the optional to approve or deny an automatically inferred geotag. By way of example only, this could appear as a "Suggested geotags for you" column in the interface of FIG. 2.

In accordance with a further aspect of the invention, a user may opt-in to enable personalized location tags. This may be done, for instance, by selecting an option on a service provider's web page, or by enabling a feature on the user's device.

The user may be required to sign up for a particular service, such as a web-enabled location application. In this case, once signed in, the user may opt-in or opt-out on a predetermined web page. In one example, as soon as the user opts-in, their status message can be changed to their city level location or "unknown location" if no location signal is available. If a user has personalized geotags available, an additional match may occur at this stage to select the appropriate geotag.

Once enabled, subsequent location signals will overwrite the location status message with the latest city or personalized geotag. In accordance with another aspect of the invention, personalized location tags may be disabled in different ways. For instance, the user may go back to the predetermined web page and opt out. The user may clear his/her status. Or the user may set a custom status, such as "unavailable" or "away."

Once the location feature is disabled, it can be re-enabled at any time by sending a command from the user's device. For instance, the user may type "loc:on" or an equivalent instruction. Once the command has been relayed to the operations server, the user's status would be reset to his/her last known location (if any) or unknown location. In one example, the status message might state: "Mountain View, Calif."

Figure 5:
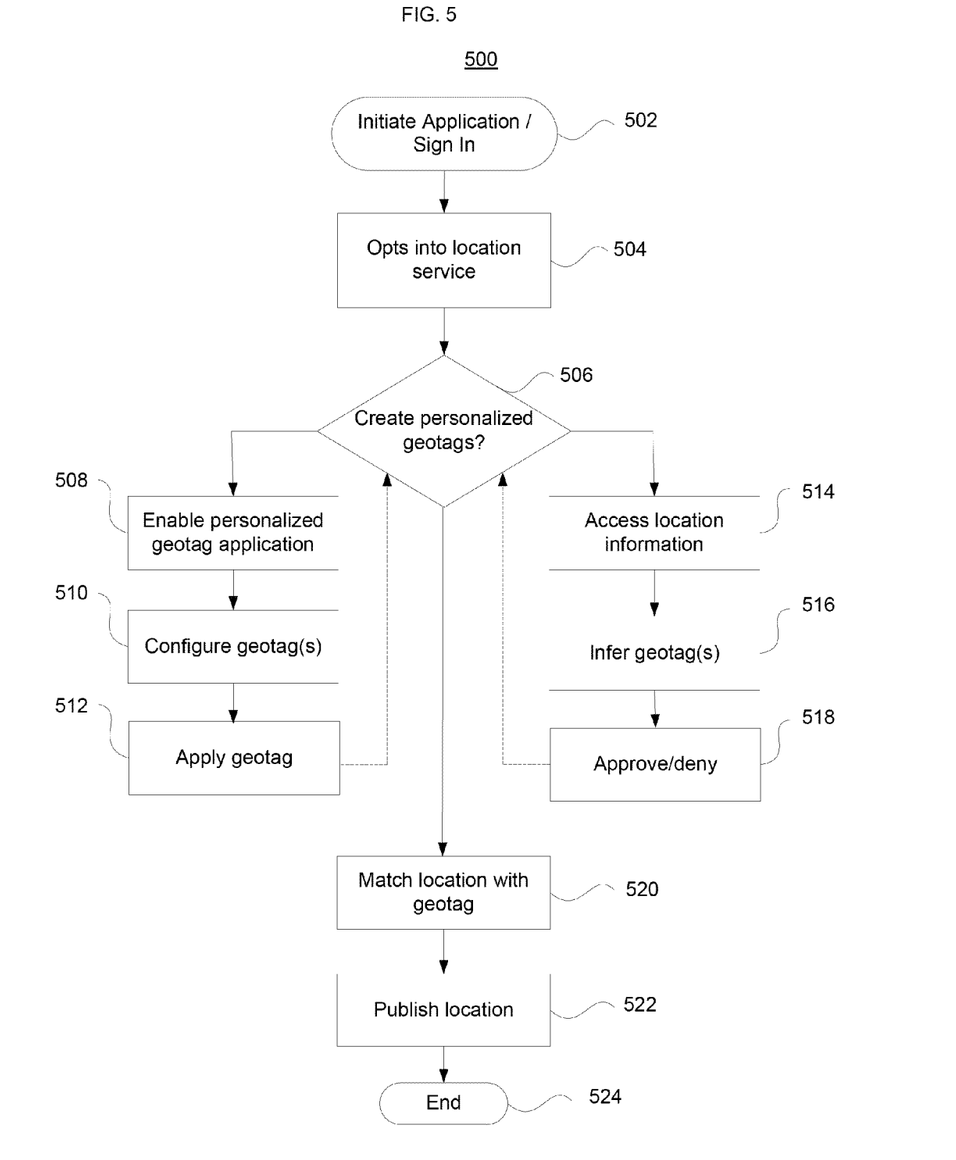
FIG. 5 illustrates a personalized geotag flowchart in accordance with aspects of the invention.

FIG. 5 presents a flow diagram 500 illustrating an exemplary process for creating and employing personalized geotags. The process may begin at block 502, where a user may sign in or otherwise initiate a location-based application. In block 504, the user may elect to op into a location service to enable publication of geotags.

In block 506, the option to create personalized geotags is presented. Such geotags may be created by a user or employing a matching engine. User creation begins at block 508. Here, an application or program for creating geotags receives input from the user to set one or more personalized geotags. This may be done by the user identifying a location on a map, inputting a street address, or capturing a latitude/longitude via GPS or other location technology. In block 510, the geotag may be configured as follows. A radius associated with the selected location is set. The user may select a predetermined name for the geotag or may create his or her own geotag name. Then, in block 512, the new geotag is applied and stored, for instance in location database 132 and/or user information database 134 of FIG. 1. The process may terminate or return to block 506 for creation of further geotags.

In certain instances, multiple geotags may overlap. In this case, the overlapping geotags may be ranked according to user preferences or in view of prior location information. By way of example only, "Laundromat" and "Food Shopping" may identify two stores in the same strip mall. They may be close enough so that their radii overlap. If the user goes to the food store more often than the Laundromat, the Food Shopping geotag may be ranked higher than Laundromat. Alternatively, if the user goes food shopping every Tuesday and Friday, and does laundry on Saturdays, then one or the other of these two geotags may be selected based upon day of week or time of day information.

Overlapping geotags may also arise due to varying confidence levels in the quality of the location information. In this case, different geotags may also be ranked depending upon the location information quality. In this case, the location information may be refined by adjusting an estimate of the user's location. This may be done by the user, by the matching engine or using information available in the network.

If a matching engine is used to create a personalized geotag, the process proceeds to block 514. Here, the matching engine accesses location-related information associated with the user. This may be done, as discussed above, by accessing map history database 312, address book database 314, calendar entries database 316, etc. As shown in block 516, the matching engine may infer geotags based upon past user activity, "wisdom of the crowd" selections or other location-related information. Once created by the matching engine, the geotag may be approved or rejected by the user as shown in block 518. The process may terminate or return to block 506 for creation of further geotags.

Once user-associated geotags have been created, the process may continue at block 520. Here, the current location of the user may be linked with a given geotag. In one example, if the user's device is powered on and physically moves to a given location, the system (e.g., the matching engine), may identify a position of the user device. This is correlated with the user's geotags, and the best fit may be published to show the user's location as in block 522. Alternatively, the matching engine may match and publish a geotag representing the user's location based upon past activity. In one scenario, this may continue so long as the user's device is powered on or until the user opts out of the location service. The process would then terminate as shown in block 524.

Figure 6A:
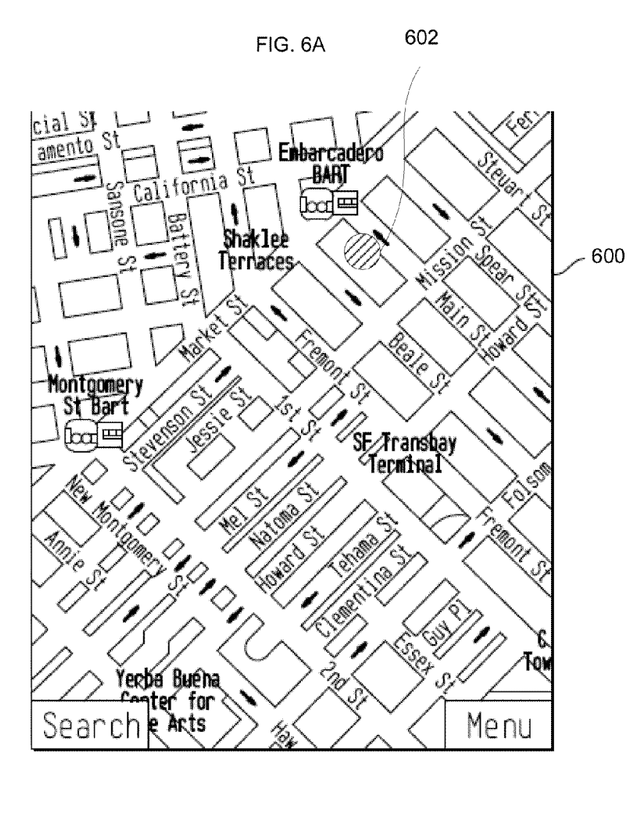
FIGS. 6A-C illustrates personalized geotag maps in accordance with aspects of the invention.
Figure 6B:
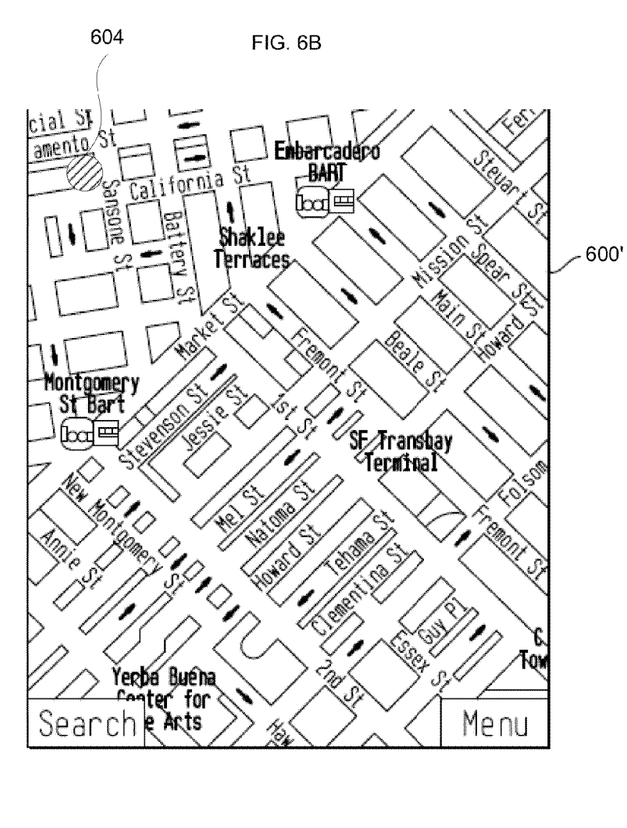
Figure 6C:
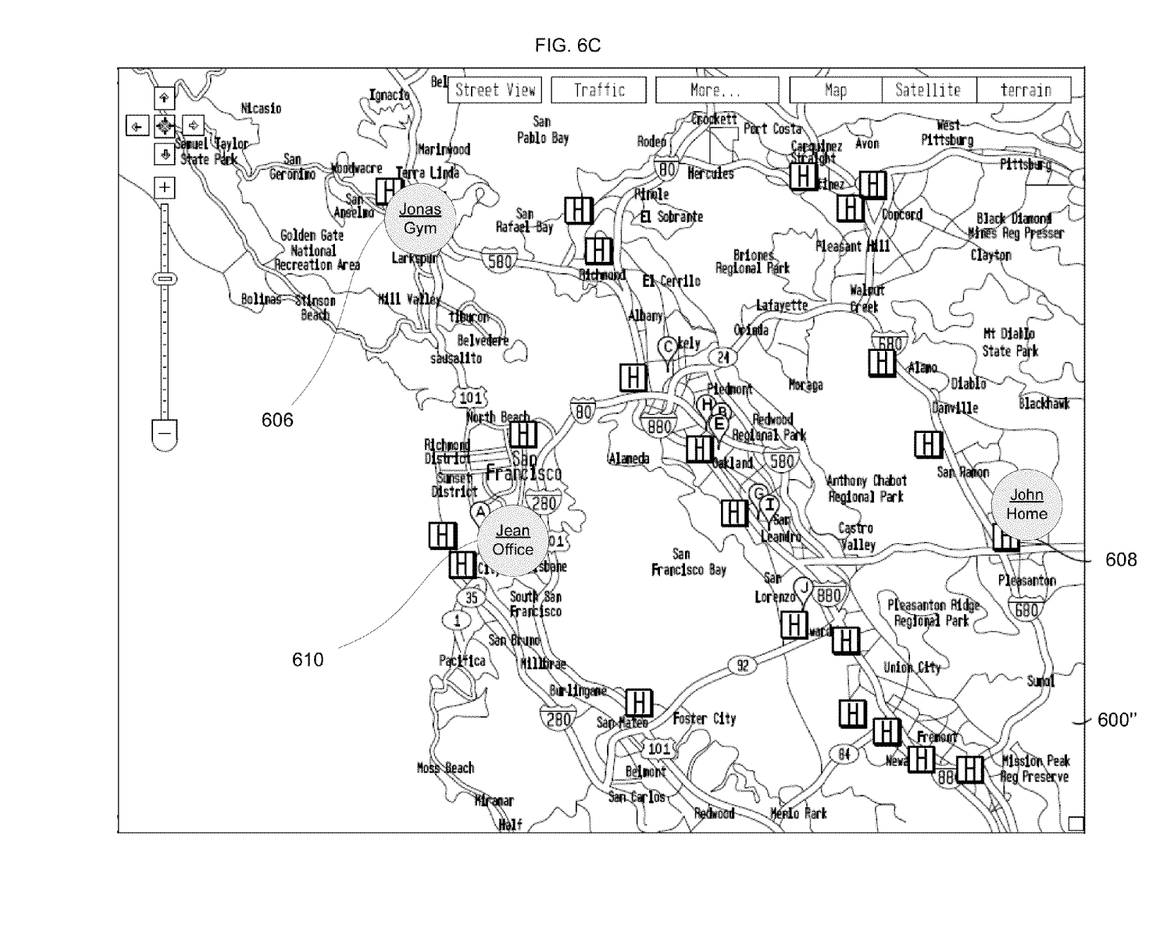

FIGS. 6A-C present maps illustrating exemplary implementations of personalized geotags. As shown in FIG. 6A, a map 600 may include a first personalized geotag 602, representing the current location of a given user. At some point later, the map 600' of FIG. 6B illustrates that a new location 604 for the user. And as shown in the map 600" of FIG. 6C, the locations of different users may be identified using personalized geotags associated with each respective user. Thus, the geotag 606 shows Jonas at the gym, the geotag 608 shows John at his home, and geotag 610 shows Jean at her office. The geotags may be implemented as overlays on a conventionally generated map. The various users illustrated may be part of the same group, or may be linked by a common user who wishes to see where each of his/her friends are. As noted above, a user may opt out of publishing his/her personalized geotag. In that case, either no geotag or a generic geotag may represent the current location of that user.

The processes and operations set forth herein may be implemented directly by one or more hardware-based processors such as sub-processing units in a multiprocessor array. Alternatively, the processes and operations may be stored in a computer-readable recording medium such as flash memory, a CD-ROM, DVD, Blu-ray disk, a hard drive and the like for execution by a processor. The information may be stored in electronic or digital format as a program for execution by the processor.

Although aspects of the invention herein have been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the invention as defined by the appended claims.

The invention claimed is:

1. A method for personalizing user location information, comprising:

analyzing at least one computer database containing information about a selected user to determine whether the at least one computer database includes historical geographic location information associated with the selected user, the historical geographic location information including one or more physical locations at which the selected user's device has been located at past times;

selecting a result set from the at least one computer database when the at least one computer database includes the historical geographic location information, the result set including at least one physical location of the one or more physical locations;

configuring geotags personalized for the selected user for each physical location in the result set, the personalized geotags each comprising geographic coordinates, an associated area, and a name associated with the selected user;

storing the personalized geotags in a memory;

selecting, when a current location for the selected user is unknown, a personalized geotag from the personalized geotags stored in the memory based on a current time compared to past times from the historical geographic location information associated with the selected user;

setting mapping information for a map, the mapping information including at least the selected personalized geotag; and transmitting the mapping information as a representation of the current location of the selected user in response to an authorized request from another user for the current location of the selected user.

2. A method for personalizing user location information, comprising:

analyzing at least one computer database containing information about a selected user to determine whether the at least one computer database includes historical geographic location information associated with the selected user, the historical geographic location information including one or more physical locations at which the selected user's device has been located at past times;

selecting a result set from the at least one computer database when the at least one computer database includes the historical geographic location information, the result set including at least one physical location of the one or more physical locations;

configuring geotags personalized for the selected user for each physical location in the result set, the personalized geotags each comprising geographic coordinates, an associated area, and a name associated with the selected user;

storing the personalized geotags in a memory;

selecting, when a current location for the selected user is unknown, a personalized geotag from the personalized geotags stored in the memory based on a current time compared to past times from the historical geographic location information associated with the selected user;

setting mapping information for a map, the mapping information including at least the selected personalized geotag; and transmitting the mapping information as a representation of the current location of the selected user in response to an authorized request from another user for the current location of the selected user.

3. A method for personalizing user location information, comprising:

analyzing at least one computer database containing information about a selected user to determine whether the at least one computer database includes historical geographic location information associated with the selected user, the historical geographic location information including one or more physical locations at which the selected user's device has been located at past times;

selecting a result set from the at least one computer database when the at least one computer database includes the historical geographic location information, the result set including at least one physical location of the one or more physical locations;

configuring geotags personalized for the selected user for each physical location in the result set, the personalized geotags each comprising geographic coordinates, an associated area, and a name associated with the selected user;

storing the personalized geotags in a memory;

selecting, when a current location for the selected user is unknown, a personalized geotag from the personalized geotags stored in the memory based on a current time compared to past times from the historical geographic location information associated with the selected user;

setting mapping information for a map, the mapping information including at least the selected personalized geotag, wherein the selected personalized geotag comprises a geotag location; and transmitting the mapping information as a representation of the current location of the selected user in response to an authorized request from another user for the current location of the selected user.

4. A method for personalizing user location information, comprising:

analyzing at least one computer database containing information about a selected user to determine whether the at least one computer database includes historical geographic location information associated with the selected user, the historical geographic location information including one or more physical locations at which the selected user's device has been located at past times;

selecting a result set from the at least one computer database when the at least one computer database includes the historical geographic location information, the result set including at least one physical location of the one or more physical locations;

configuring geotags personalized for the selected user for each physical location in the result set, the personalized geotags each comprising geographic coordinates, an associated area, and a name associated with the selected user;

storing the personalized geotags in a memory;

selecting, when a current location for the selected user is unknown, a personalized geotag from the personalized geotags stored in the memory based on a current time compared to past times from the historical geographic location information associated with the selected user;

setting mapping information for a map, the mapping information including at least the selected personalized geotag, wherein the selected personalized geotag comprises a geotag location;

transmitting the mapping information as a representation of the current location of the selected user in response to an authorized request from another user for the current location of the selected user; and enabling or disabling access to the mapping information based upon a selection by the selected user.

5. A method for personalizing user location information, comprising:

analyzing at least one computer database containing information about a selected user to determine whether the at least one computer database includes historical geographic location information associated with the selected user, the historical geographic location information including one or more physical locations at which the selected user's device has been located at past times;

selecting a result set from the at least one computer database when the at least one computer database includes the historical geographic location information, the result set including at least one physical location of the one or more physical locations;

configuring geotags personalized for the selected user for each physical location in the result set, the personalized geotags each comprising geographic coordinates, an associated area, and a name associated with the selected user;

storing the personalized geotags in a memory;

selecting, when a current location for the selected user is unknown, a personalized geotag from the personalized geotags stored in the memory based on a current time compared to past times from the historical geographic location information associated with the selected user;

setting mapping information for a map, the mapping information including at least the selected personalized geotag, wherein the selected personalized geotag comprises a geotag location; and transmitting the mapping information as a representation of the current location of the selected user in response to an authorized request from another user for the current location of the selected user.

6. A method for personalizing user location information, comprising:

analyzing at least one computer database containing information about a selected user to determine whether the at least one computer database includes historical geographic location information associated with the selected user, the historical geographic location information including one or more physical locations at which the selected user's device has been located at past times;

selecting a result set from the at least one computer database when the at least one computer database includes the historical geographic location information, the result set including at least one physical location of the one or more physical locations;

configuring geotags personalized for the selected user for each physical location in the result set, the personalized geotags each comprising geographic coordinates, an associated area, and a name associated with the selected user;

storing the personalized geotags in a memory;

selecting, when a current location for the selected user is unknown, a personalized geotag from the personalized geotags stored in the memory based on a current time compared to past times from the historical geographic location information associated with the selected user;

setting mapping information for a map, the mapping information including at least the selected personalized geotag; and transmitting the mapping information as a representation of the current location of the selected user in response to an authorized request from another user for the current location of the selected user, wherein at least one of the personalized geotags configured for a given physical location in the result set is inferred based upon the historical geographic location information.

7. A method for personalizing user location information, comprising:

analyzing at least one computer database containing information about a selected user to determine whether the at least one computer database includes historical geographic location information associated with the selected user, the historical geographic location information including one or more physical locations at which the selected user's device has been located at past times;

selecting a result set from the at least one computer database when the at least one computer database includes the historical geographic location information, the result set including at least one physical location of the one or more physical locations;

configuring geotags personalized for the selected user for each physical location in the result set, the personalized geotags each comprising geographic coordinates, an associated area, and a name associated with the selected user;

storing the personalized geotags in a memory;

selecting, when a current location for the selected user is unknown, a personalized geotag from the personalized geotags stored in the memory based on a current time compared to past times from the historical geographic location information associated with the selected user;

setting mapping information for a map, the mapping information including at least the selected personalized geotag; and transmitting the mapping information as a representation of the current location of the selected user in response to an authorized request from another user for the current location of the selected user, wherein at least one of the personalized geotags configured for a given physical location in the result set is chosen due to a likelihood that the selected user will be at the given physical location again based on past behavior.

8. A processing system for processing personalized user location information, comprising:

at least one processor; and a memory storing instructions executable by the at least one processor, the instructions, which when executed by the at least one processor, cause the processor to perform operations comprising:

analyzing at least one computer database stored in the memory, the at least one computer database containing information about a selected user to determine whether the at least one computer database includes historical geographic location information associated with the selected user, the historical geographic location information including one or more physical locations at which the selected user's device has been located at past times;

selecting a result set from the at least one computer database when the at least one computer database includes the historical geographic location information, the result set including at least one physical location of the one or more physical locations;

configuring geotags personalized for the selected user for each physical location in the result set, the personalized geotags each comprising geographic coordinates, an associated area, and a name associated with the selected user;

selecting, when a current location for the selected user is unknown, a personalized geotag from the geotags personalized for the selected user based on a current time compared to past times from the historical geographic location information associated with the selected user;

setting mapping information for a map, the mapping information including at least the selected personalized geotag, wherein the selected personalized geotag comprises a geotag location; and transmitting the mapping information as a representation of the current location of the selected user in response to an authorized request from another user for the current location of the selected user,
wherein the matching engine is configured to infer the result set based upon past activity by the selected user.

9. A processing system for processing personalized user location information, comprising:
at least one processor; and
a memory storing instructions executable by the at least one processor, the instructions, which when executed by the at least one processor, cause the processor to perform operations comprising:
analyzing at least one computer database stored in the memory, the at least one computer database containing information about a selected user to determine whether the at least one computer database includes historical geographic location information associated with the selected user, the historical geographic location information including one or more physical locations at which the selected user's device has been located at past times;
selecting a result set from the at least one computer database when the at least one computer database includes the historical geographic location information, the result set including at least one physical location of the one or more physical locations; and
configuring geotags personalized for the selected user for each physical location in the result set, the personalized geotags each comprising geographic coordinates, an associated area, and a name associated with the selected user;
selecting, when a current location for the selected user is unknown, a personalized geotag from the geotags personalized for the selected user based on a current time compared to past times from the historical geographic location information associated with the selected user;
setting mapping information for a map, the mapping information including at least the selected personalized geotag, wherein the selected personalized geotag comprises a geotag location; and
transmitting the mapping information as a representation of the current location of the selected user to a remote server in response to an authorized request from another user for the current location of the selected user.

10. A processing system for processing personalized user location information, comprising:
at least one processor; and
a memory storing instructions executable by the at least one processor, the instructions, which when executed by the at least one processor, cause the processor to perform operations comprising:
analyzing at least one computer database stored in the memory, the at least one computer database containing information about a selected user to determine whether the at least one computer database includes historical geographic location information associated with the selected user, the historical geographic location information including one or more physical locations at which the selected user's device has been located at past times;
selecting a result set from the at least one computer database when the at least one computer database includes the historical geographic location information, the result set including at least one physical location of the one or more physical locations;
configuring geotags personalized for the selected user for each physical location in the result set, the personalized geotags each comprising geographic coordinates, an associated area, and a name associated with the selected user;
selecting, when a current location for the selected user is unknown, a personalized geotag from the geotags personalized for the selected user based on a current time compared to past times from the historical geographic location information associated with the selected user;
setting mapping information for a map, the mapping information including at least the selected personalized geotag, wherein the selected personalized geotag comprises a geotag location; and
transmitting the mapping information as a representation of the current location of the selected user in response to an authorized request from another user for the current location of the selected user,
wherein the processing system comprises a portable client device and the at least one computer database is stored in the memory of portable client device.

11. A processing system for processing personalized user location information, comprising:
at least one processor; and
a memory storing instructions executable by the at least one processor, the instructions, which when executed by the at least one processor, cause the processor to perform operations comprising:
analyzing at least one computer database stored in the memory, the at least one computer database containing information about a selected user to determine whether the at least one computer database includes historical geographic location information associated with the selected user, the historical geographic location information including one or more physical locations at which the selected user's device has been located at past times;
selecting a result set from the at least one computer database when the at least one computer database includes the historical geographic location information, the result set including at least one physical location of the one or more physical locations;
configuring geotags personalized for the selected user for each physical location in the result set, the personalized geotags each comprising geographic coordinates, an associated area, and a name associated with the selected user;
selecting, when a current location for the selected user is unknown, a personalized geotag from the geotags personalized for the selected user based on a current time compared to past times from the historical geographic location information associated with the selected user;
setting mapping information for a map, the mapping information including at least the selected personalized geotag, wherein the selected personalized geotag comprises a geotag location; and
publishing the selected personalized geotag as a representation of the current location of the selected user,
wherein the processor is configured to receive requests from another user about a location of the selected user, to validate whether that other user has authorization to access the location, and to transmit the mapping information including the selected personalized geotag identifying the location to the other user upon validation.

12. The processing system of claim 11, wherein the processor validates the authorization if the other user is a member of a social network of the selected user.

13. The processing system of claim 11, wherein if when the selected user is traveling between two physical locations in the result set, the processor is configured to transmit updated mapping information including an indicator showing the selected user is traveling.

14. A method of managing personalizing user location information, comprising:
    analyzing at least one computer database containing information about a selected user to determine whether the at least one computer database includes historical geographic location information associated with the selected user, the historical geographic location information including one or more physical locations at which the selected user's device has been located at past times;
    selecting a result set from the at least one computer database when the at least one computer database includes the historical geographic location information, the result set including at least one physical location of the one or more physical locations;
    configuring geotags personalized for the selected user for each physical location in the result set, the personalized geotags each comprising geographic coordinates, an associated area, and a name associated with the selected user;
    identifying, by a matching engine, when a current location for the selected user is unknown, at least two personalized geotags based on a current time compared to past times from the historical geographic location information associated with the selected user;
    determining, by the matching engine, whether there is an overlap between the at least two personalized geotags, wherein the at least two personalized geotags are ranked according to a preference of the specific user;
    selecting the personalized geotag from the at least two personalized geotags based on the rank of the selected personalized geotag; and
    transmitting the mapping information as a representation of the current location of the selected user in response to an authorized request from another user for the current location of the selected user.

15. A method of managing personalizing user location information, comprising:
    analyzing at least one computer database containing information about a selected user to determine whether the at least one computer database includes historical geographic location information associated with the selected user, the historical geographic location information including one or more physical locations at which the selected user's device has been located at past times;
    selecting a result set from the at least one computer database when the at least one computer database includes the historical geographic location information, the result set including at least one physical location of the one or more physical locations;
    configuring geotags personalized for the selected user for each physical location in the result set, the personalized geotags each comprising geographic coordinates, an associated area, and a name associated with the selected user;
    identifying, by a matching engine, when a current location for the selected user is unknown, at least two personalized geotags based on a current time compared to past times from the historical geographic location information associated with the selected user;
    determining, by the matching engine, whether there is an overlap between the at least two personalized geotags, wherein the at least two personalized geotags are ranked according to the historical geographic location information of the specific user;
    selecting the personalized geotag from the at least two personalized geotags based on the rank of the selected personalized geotag; and
    transmitting the mapping information as a representation of the current location of the selected user in response to an authorized request from another user for the current location of the selected user.

16. A method of managing personalizing user location information, comprising:
    analyzing at least one computer database containing information about a selected user to determine whether the at least one computer database includes historical geographic location information associated with the selected user, the historical geographic location information including one or more physical locations at which the selected user's device has been located at past times;
    selecting a result set from the at least one computer database when the at least one computer database includes the historical geographic location information, the result set including at least one physical location of the one or more physical locations;
    configuring geotags personalized for the selected user for each physical location in the result set, the personalized geotags each comprising geographic coordinates, an associated area, and a name associated with the selected user;
    identifying, by a matching engine, when a current location for the selected user is unknown, at least two personalized geotags based on a current time compared to past times from the historical geographic location information associated with the selected user;
    determining, by the matching engine, whether there is an overlap between the at least two personalized geotags, wherein the at least two personalized geotags are ranked;
    selecting, when there is an overlap, the personalized geotag from the at least two personalized geotags based on the rank of the selected personalized geotag; and
    transmitting the mapping information as a representation of the current location of the selected user in response to an authorized request from another user for the current location of the selected user,
    wherein the associated area of each personalized geotag includes is defined by a location radius, and the overlap is caused by overlapping radii of the geotags.

17. A method of managing personalizing user location information, comprising:
    analyzing at least one computer database containing information about a selected user to determine whether the at least one computer database includes historical geographic location information associated with the selected user, the historical geographic location information including one or more physical locations at which the selected user's device has been located at past times;
    selecting a result set from the at least one computer database when the at least one computer database includes the historical geographic location information, the result set including at least one physical location of the one or more physical locations;

configuring geotags personalized for the selected user for each physical location in the result set, the personalized geotags each comprising geographic coordinates, an associated area, and a name associated with the selected user;

identifying, by a matching engine, when a current location for the selected user is unknown, at least two personalized geotags based on a current time compared to past times from the historical geographic location information associated with the selected user;

determining, by the matching engine, whether there is an overlap between the at least two personalized geotags, wherein the at least two personalized geotags are ranked;

selecting, when there is an overlap, the personalized geotag from the at least two personalized geotags based on the rank of the selected personalized geotag; and transmitting the mapping information as a representation of the current location of the selected user in response to an authorized request from another user for the current location of the selected user, wherein each personalized geotag has a confidence level for the respective associated area, and the overlap is caused by varying confidence levels between different respective associated areas.

* * * * *